(12) United States Patent  
Bianda et al.

(10) Patent No.: US 11,277,078 B2  
(45) Date of Patent: Mar. 15, 2022

(54) FULL-BRIDGE INVERTER WITH UNIPOLAR SWITCHING SCHEME AND ITS METHOD OF OPERATION

(71) Applicant: ABB Schweiz AG, Baden (CH)

(72) Inventors: Enea Bianda, Baden (CH); Tin-Ho Li, Hong Kong (CN); Juha Huusari, Helsinki (FI); Ngai-Man Ho, Winnipeg (CA)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/080,194

(22) Filed: Oct. 26, 2020

(65) Prior Publication Data

US 2021/0126554 A1    Apr. 29, 2021

(30) Foreign Application Priority Data

Oct. 25, 2019  (EP) .................................... 19205300

(51) Int. Cl.
*H02M 7/5387*  (2007.01)
*H02M 1/14*   (2006.01)
(Continued)

(52) U.S. Cl.
CPC ......... *H02M 7/53871* (2013.01); *H02M 1/14* (2013.01); *H02M 1/0054* (2021.05); *H02M 1/34* (2013.01); *H02M 1/44* (2013.01)

(58) Field of Classification Search
CPC .. H02M 7/5387; H02M 7/53871; H02M 1/14; H02M 1/0054; H02M 1/34; H02M 1/44
See application file for complete search history.

(56) References Cited

U.S. PATENT DOCUMENTS

| | | | |
|---|---|---|---|
| 2009/0196072 A1* | 8/2009 | Ye ......................... | H02M 7/493 363/17 |
| 2014/0301123 A1* | 10/2014 | Lee ................... | H02M 7/53871 363/132 |
| 2020/0052601 A1* | 2/2020 | Kamon ............... | H02M 7/5387 |

FOREIGN PATENT DOCUMENTS

| | | |
|---|---|---|
| EP | 2882090 A1 | 6/2015 |
| WO | 2009156230 A2 | 12/2009 |
| WO | 2009156230 A3 | 12/2009 |

OTHER PUBLICATIONS

European Patent Office, Extended Search Report issued in corresponding Application No. 19205300.7, dated May 25, 2020, 8 pp.

(Continued)

*Primary Examiner* — Adolf D Berhane
(74) *Attorney, Agent, or Firm* — Leydig, Voit & Mayer, Ltd.

(57) ABSTRACT

A full-bridge inverter based on a unipolar switching scheme includes a first branch and a second branch in parallel between a first DC node and a second node, the first branch including a first higher switch and a first lower switch in series, and the second branch including a second higher switch and a second lower switch in series. A filter circuit includes a first inductor and a second inductor. One pin of the first inductor is coupled with a first branch conductor, and the first branch conductor is coupled between the first higher switch and the first lower switch, and an opposite pin of the first inductor is electrically coupled with a first output node. One pin of the second inductor is coupled with a second branch conductor, the second branch conductor is coupled between the second higher switch and the second lower switch, and an opposite pin of the second inductor is coupled with a second output node of the full-bridge inverter. A first filtering unit switch, a first filter diode, a second filter diode and a second filtering unit switch in series are coupled between the first branch conductor and the second branch conductor, cathodes of the first diode and the second diode are coupled together. A cathode of a third filter diode is coupled with the first output node, and a cathode of a fourth filter diode is coupled with the second output node. The anodes of the third diode and the fourth diode are coupled together. A third inductor is coupled between the cathodes of the first diode and the second diode and the anodes of the third diode and the fourth diode.

9 Claims, 10 Drawing Sheets

(51) Int. Cl.
*H02M 1/34* (2007.01)
*H02M 1/44* (2007.01)
*H02M 1/00* (2006.01)

(56) References Cited

OTHER PUBLICATIONS

Bellar et al., "A Review of Soft-Switched DC-AC Converters," IEEE Transactions on Industry Applications, vol. 34, No. 4, Jul./Aug. 1998, pp. 847-860.
De Freitas et al., "A High-Power High-Frequency ZCS-SVS-PWM Buck Converter Using a Feedback Resonant Circuit," IEEE Transactions on Power Electronics, vol. 10, No. 1, Jan. 1995, pp. 19-24.
Jiang et al., "A Novel Single-Phase Soft-Switching Unipolar PWM Inverter," 8th International Conference on Power Electronics, ECCE Asia, May 30-Jun. 3, 2011, The Shilla Jeju, Korea, pp. 2874-2879.
Khan et al., "Transformerless Inverter Topologies for Single-Phase Photovoltaic Systems: A Comparative Review," IEEE Journal of Emerging and Selected Topics in Power Electronics, vol. 8, No. 1, Mar. 2020, pp. 805-835.
Li et al., "Topology Review and Derivation Methodology of Single-Phase Transformerless Photovoltaic Inverters for Leakage Current Suppression," IEEE Transactions on Industrial Electronics, vol. 62, No. 7, Jul. 2015, pp. 4537-4551.
Smith et al., "A Comparison of Voltage-Mode Soft-Switching Methods for PWM Converters," IEEE Transactions on Power Electronics, vol. 12, No. 2, Mar. 1997, pp. 376-386.

\* cited by examiner

FULL-BRIDGE INVERTER WITH UNIPOLAR SWITCHING SCHEME AND ITS METHOD OF OPERATION

FIELD

The invention relates to a full-bridge inverter with unipolar switching scheme and a method of its operation.

BACKGROUND

A full-bridge (FB) inverter with unipolar switching scheme (USS) is a popular combination in grid connected inverter applications, an example of which is a photovoltaic (PV) inverter because of high power efficiency and a simple circuitry and control. In order to reduce the size of the output inductor, the switching frequency should to be increased. However, a high switching frequency will incur high switching loss and thus the overall power efficiency will be offset. Hence, there is a need for improvement.

BRIEF DESCRIPTION

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of a full-bridge inverter based on a unipolar switching scheme;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

In the electrical performance point of view, low switching limits a dynamic response of a power converter/inverter. Consequently, a higher switching frequency has benefits of lowering the bill-of-material cost by enabling lesser usage of ac output filter inductive materials and providing faster dynamic response. Thus, a problem is how to make the power converter/inverter to operate in a high switching frequency with high power efficiency simultaneously.

The inverter output voltage switches between zero and $+V_{output}$ during any positive half cycle of the operating frequency of a switching scheme. The unipolar switched inverter is often used because its switching losses are lower than that of a bipolar switching scheme and it generates less EMI (Electromagnetic Interference).

Figure 1:
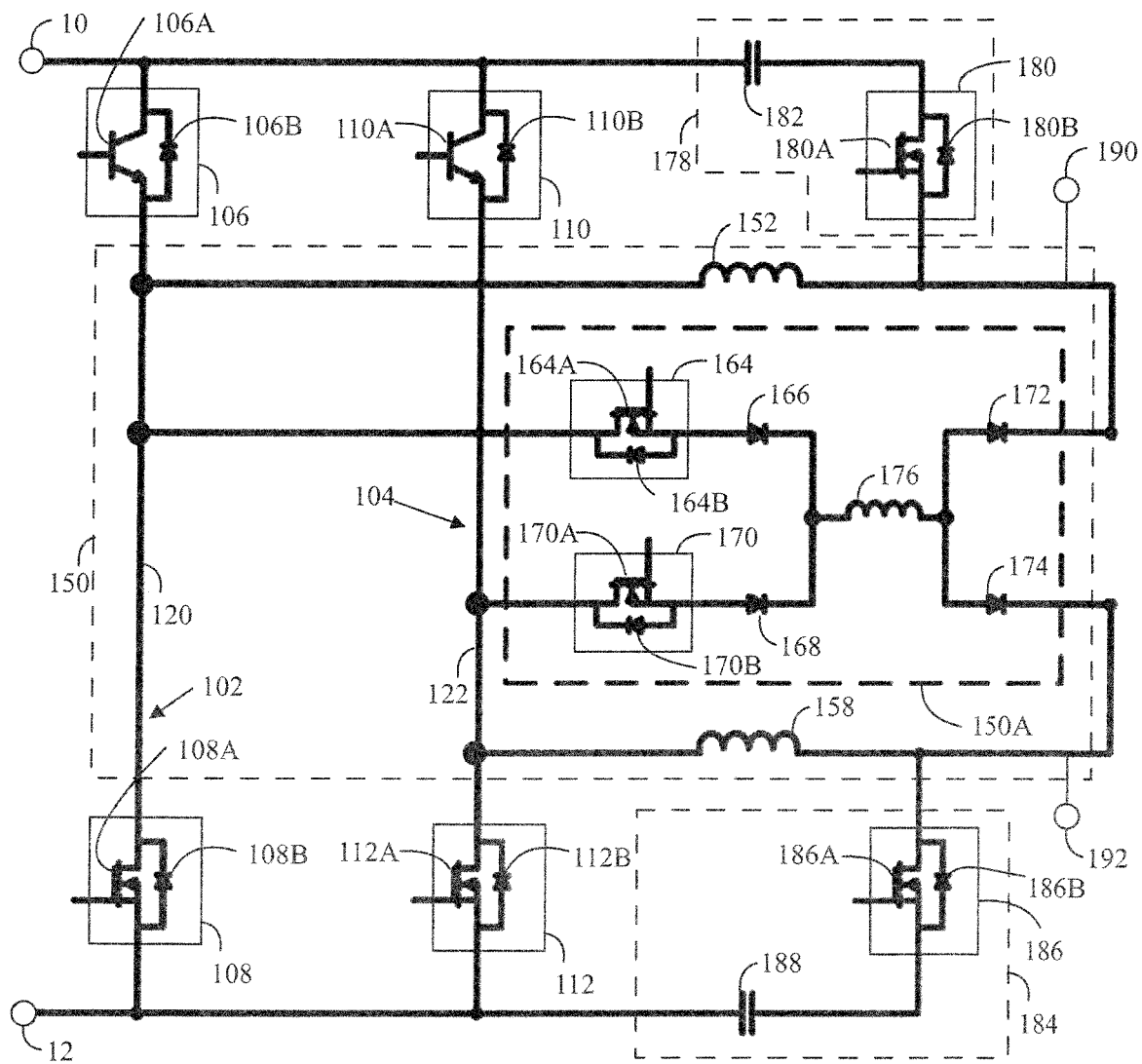

FIG. 1 illustrates an example of a full-bridge inverter 100, which is controlled based on a unipolar switching scheme. The full-bridge inverter 100 converts DC (Direct Current) electric power to AC (Alternating Current) electric power. The full-bridge inverter 100 comprises a first branch 102 and a second branch 104, which are electrically coupled in parallel between a first (higher voltage) DC node 10 and a second (lower voltage) DC node 12 of the full-bridge inverter 100. The first node 10 and the second node 12 receive the DC electric power. The first branch 102 comprises a first higher switch 106 and a first lower switch 108 in series. The second branch 104 comprises a second higher switch 110 and a second lower switch 112 in series.

The full-bridge inverter 100 also comprises a filter circuit 150, which, in turn, comprises a first inductor 152, one pin 154 of the first inductor 152 being electrically coupled with a first branch conductor 120, which is electrically coupled between the first higher switch 106 and the first lower switch 108. An opposite pin 156 of the first inductor 152 is electrically coupled with a first output node 190 of the full-bridge inverter 100.

The full-bridge inverter 100 further comprises a second inductor 158, one pin 160 of the second inductor 158 being electrically coupled with a second branch conductor 122, which is electrically coupled between the second higher switch 110 and the second lower switch 112. An opposite pin 162 of the second inductor 158 is electrically coupled with a second output node 192 of the full-bridge inverter 100.

The full-bridge inverter 100 additionally comprises a first filtering unit switch 164, a first filter diode 166, a second filter diode 168 and a second filtering unit switch 170 in series and they are electrically coupled between the first branch conductor 120 and the second branch conductor 122. Cathodes of the first diode 166 and the second diode 168 are electrically coupled together.

The full-bridge inverter 100 further comprises a third filter diode 172, whose cathode is electrically coupled with the first output node 190, and a fourth filter diode 174, whose cathode is electrically coupled with the second output node 192. Anodes of the third diode 172 and the fourth diode 174 being electrically coupled together.

The full-bridge inverter 100 further comprises a third inductor 176, which is electrically coupled between the cathodes of the first diode 166 and the second diode 168 and the anodes of the third diode 172 and the fourth diode 174.

Furthermore, the full-bridge inverter 100 comprises electric path circuits 178, 184, which conduct an electric current between the third inductor 176 and the first DC node 10 in response to switching the first filtering unit switch 164 into an electrically conducting state, and which conduct an electric current between the third inductor 176 and the second DC node 12 in response to switching the second filtering unit switch 170 into an electrically conducting state.

In an embodiment, the electric path circuits 178, 184 may comprise a first electric path circuit 178 electrically coupled between the first output node 190 and the first DC node 10 for conducting an electric current between the third inductor 176 and the first DC node 10. The electric path circuits 178, 184 may comprise a second electric path circuit 184 electrically coupled between the second output node 192 and the second DC node 12 for conducting an electric current between the third inductor 176 and the second DC node 12.

In an embodiment, the first electric path circuit 178 may comprise a first path switch 180 and a first capacitor 182 in series. The first path switch 180 may switch into an electrically conducting state for conducting an electric current between the third inductor 176 and the first DC node 10. The second electric path circuit 184 may comprise a second path switch 186 and a second capacitor 188 in series. The second path switch 186 may switch into an electrically conducting state for conducting an electric current between the third inductor 176 and the second DC node 12.

In an embodiment, values of the first capacitor 182 and the second capacitor 188 may be chosen such that a high frequency disturbance (differential mode and/or common mode) may be filtered with the first electric path circuit 178 and the second electric path circuit 184, when the first path switch 180 and the second path switch 186 is in an electrically conducting state. The values of the first capacitor 182 and the second capacitor 188 may be chosen on the basis of the switching frequency. When the switching frequency increases, the values of the capacitances may be decreased for keeping a pass band at at least about the band of the disturbance. A person skilled in the art can determine suitable values of the capacitors without a burden on the basis of a laboratory test, simulation or theoretical analysis. In an embodiment, an operational frequency of the switches 106, 108, 110, 112, 164, 170, 180 and 186 may be in a range of 1 kHz to 10 kHz, for example. In an embodiment, an operational frequency of the switches 106, 108, 110, 112, 164, 170, 180 and 186 may be in a range of 10 kHz to 100 kHz, for example.

In an embodiment, each of the first higher switch 106, and the second higher switch 110 may comprise a bipolar junction transistor 106A, 110A and a reverse biased diode 106B, 110B. In a corresponding manner, the first lower switch 108 and each of the second lower switch 112 may comprise a field effect transistor 108A, 112A and a reverse biased diode 108B, 112B.

Figure 2:
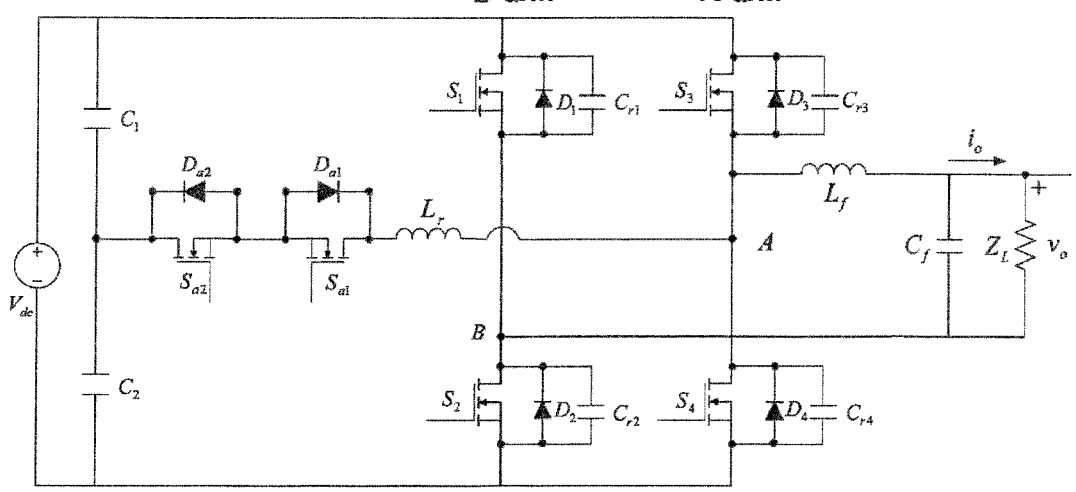
FIG. 2 illustrates an example of a prior art snubber circuit for FB with USS.

Examine now the basis of the operation of the full-bridge (FB) inverter 100 based on a unipolar switching scheme (USS). A prior art snubber circuit for FB with USS is shown in FIG. 2. It is presented and well explained in M. C. Jiang, W. S. Wang, H. K. Fu and K. W. Chang, "A novel single-phase soft-switching unipolar PWM inverter" in Proc. IEEE International Conference on Power Electronics and ECCE Asia, 2011, pp. 2874-2879, which is why it is not explained here in more detail. The high frequency switches in this FB circuit can perform ZV turn-on by the assistance of the snubber circuit. However, the snubber circuit of FIG. 2 can only work with the FB with USS in a manner of high frequency leg and low frequency leg. FB inverter with this leg configuration results in a high ground leakage current when the low frequency leg commutate and thus it is not preferred in many applications, such as photo voltaic inverter solutions.

An operating principle of the full-bridge inverter 100 based on a unipolar switching scheme is similar to the prior art presented in L. C. de. Freitas and P. R. C. Gomes, "A High-Frequency ZCS-ZVS-PWM Buck Converter Using a Feedback Resonant Circuit" IEEE Trans. Power Electronics, vol 10, no. 1, January 1995, pp. 19-24 and K. M. Smith and K. M. Smedley, "A Comparison of Voltage-Mode Soft-Switching Methods for PWM Converters" IEEE Trans. Power Electronics, vol. 12, no. 2, March 1997, pp. 376-386. That is why a detailed explanation of the switching of different switches of the full-bridge inverter 100 is not necessary but it is useful to explain how disturbance, leakage and power efficiency can be optimized.

For the inverter in single-phase grid-connected applications, it is necessary to have the first inductor 152 and the second inductor 158 on the live and neutral wires because of EMI and safety issues. However, the two inductors in said wires may not work ideally. Namely, the inductors 152, 158 on said wires may require the electric path circuitries 178, 184 in addition to the filter circuit 150 and its inner circuit 150A.

Figure 3:
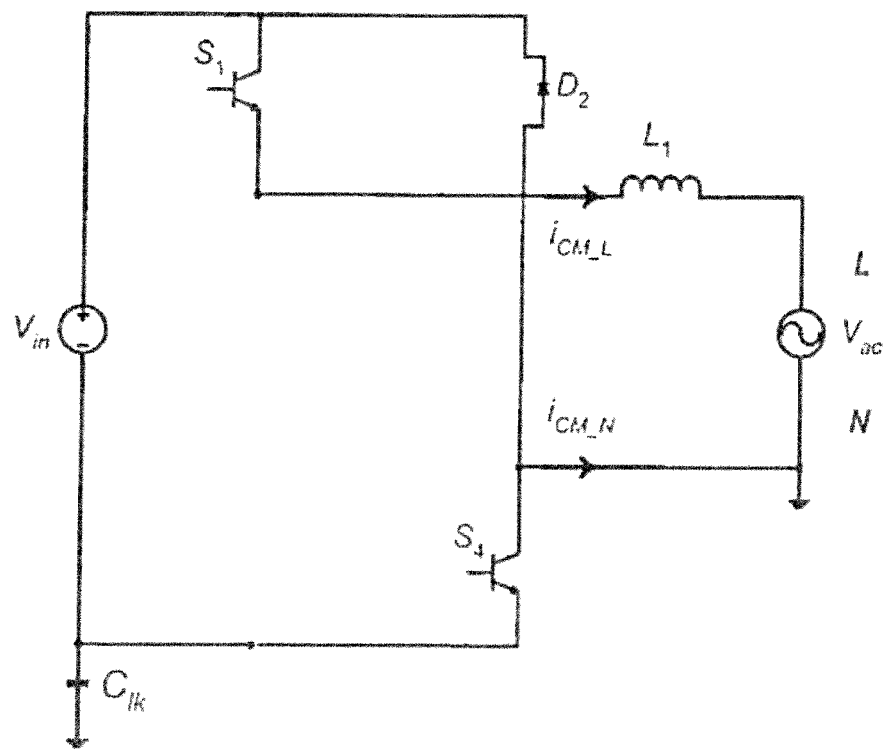
FIGS. 3 to 6 illustrate an example of operation of a full-bridge inverter with only one output inductor.
Figure 4:
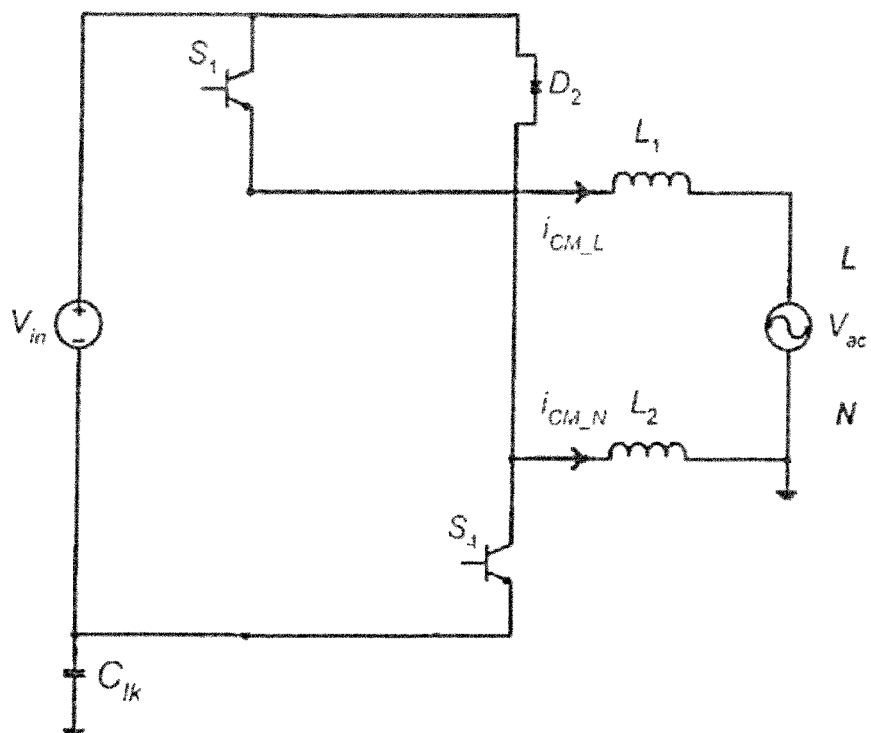

FIG. 3 shows the FB with only one output inductor $L_1$ (corresponding to first inductor 152 of FIG. 1). The impedance to the CM (Common Mode) current via the live wire (marked with L) is determined by $L_1$ but via neutral wire (marked with N) is zero. Therefore, the design of the CM filter is limited by the CM current on the neutral wire, which results in a larger CM filter than the one with inductors on both live and neutral wires as shown in FIG. 4.

Figure 5:
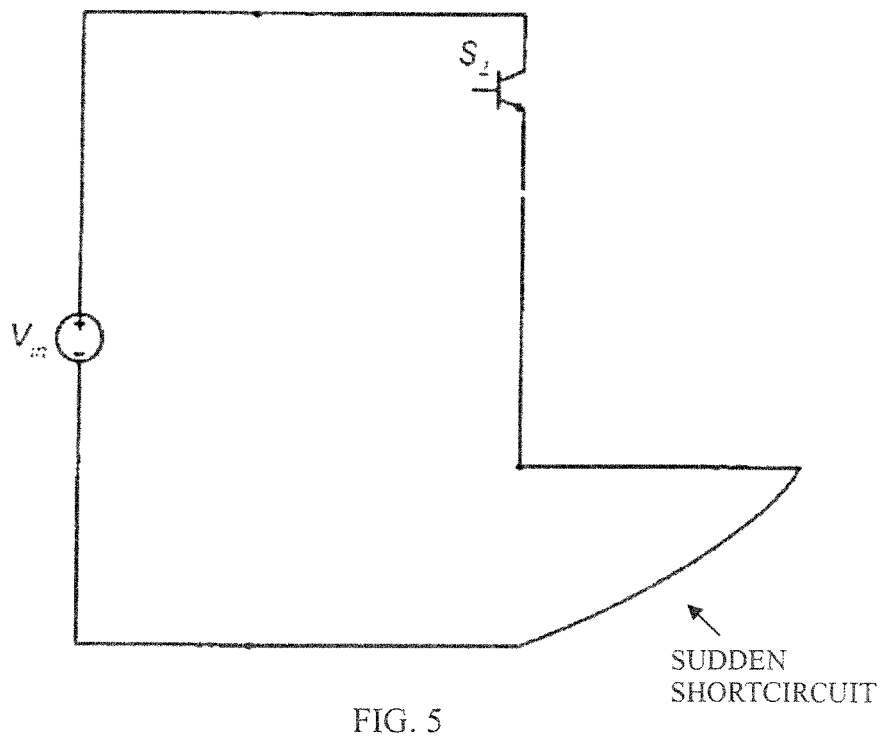
Figure 6:
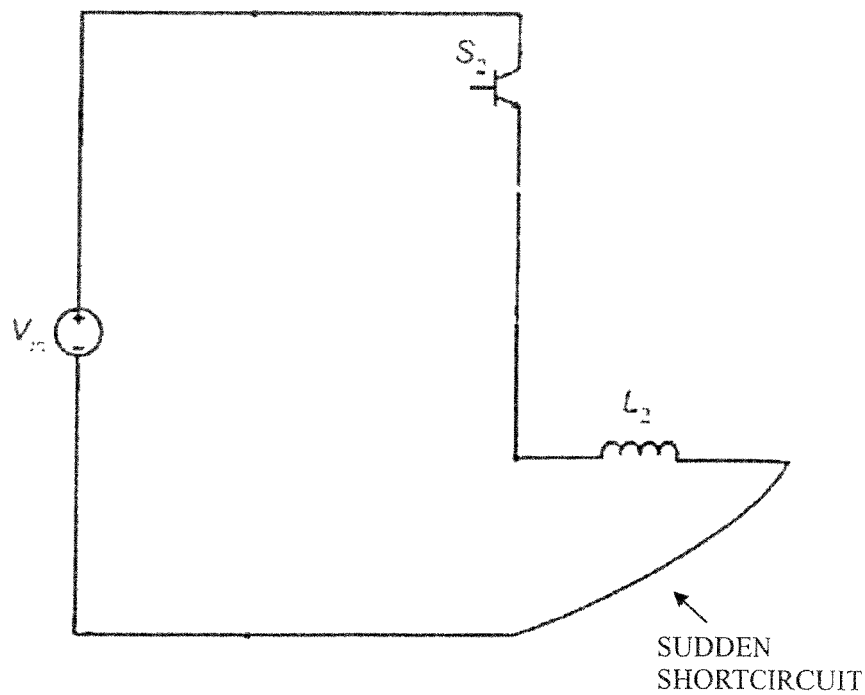

FIG. 5 shows the problem of using only one inductor on either of the live wire or neutral wire. If there is a short circuit between the negative of input and neutral of the AC grid, a short circuit will result when the switch $S_2$ (corresponding to second higher switch 110 of FIG. 1) is on. The path of short circuit is no way to protect, as the impedance of the path is zero ideally. However, input with inductors (first and second inductors 152 and 158) on both live and neutral wires as shown in FIG. 6, the short circuit current will be slowed down by the inductor L2 (corresponding to second inductor 158 in FIG. 1) on the neutral wire. Therefore, the second electric path circuit 184 and correspondingly the first electric path circuit 178 still has enough time to react to the situation. As a result, in practical application of an embodiment, a FB inverter may have an inductor 152, 158 on both live and neutral wires. However, this requirement prevents the implementation of the snubber circuit in the prior art inverter applications, such as those presented in the papers of L. C. de. Freitas and P. R. C. Gomes and K. M. Smith and K. M. Smedley mentioned above.

Figure 7:
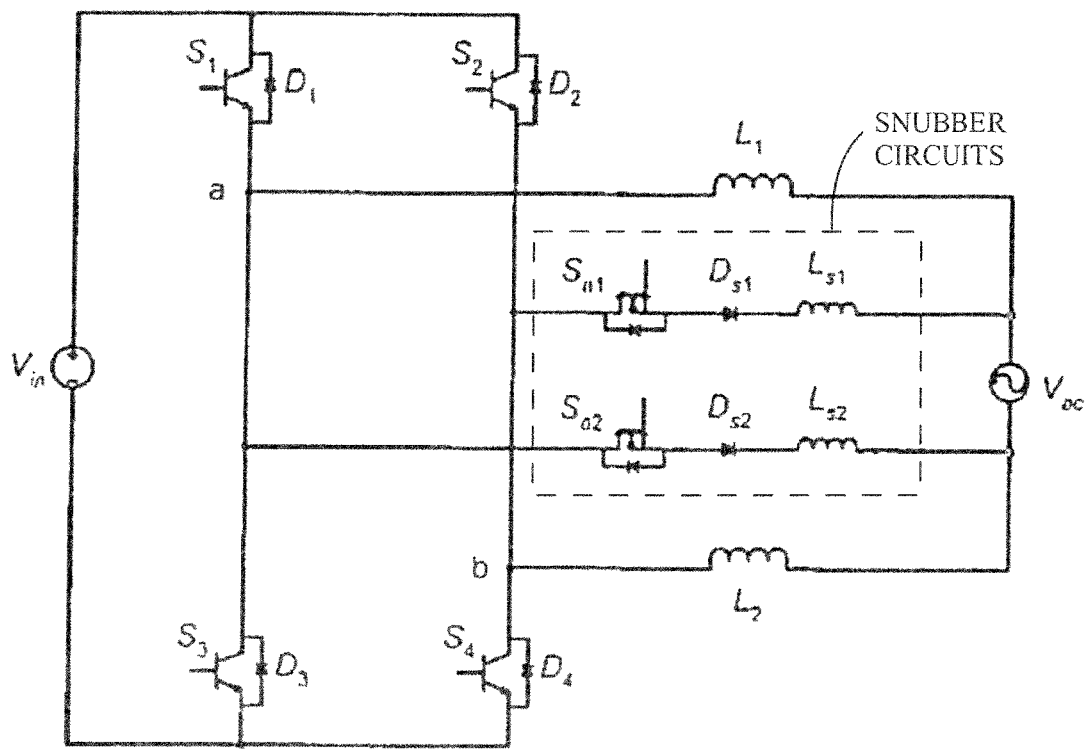
FIGS. 7 and 8 illustrate an example of problems related with application of a snubber circuit to full-bridge inverter.
Figure 8:
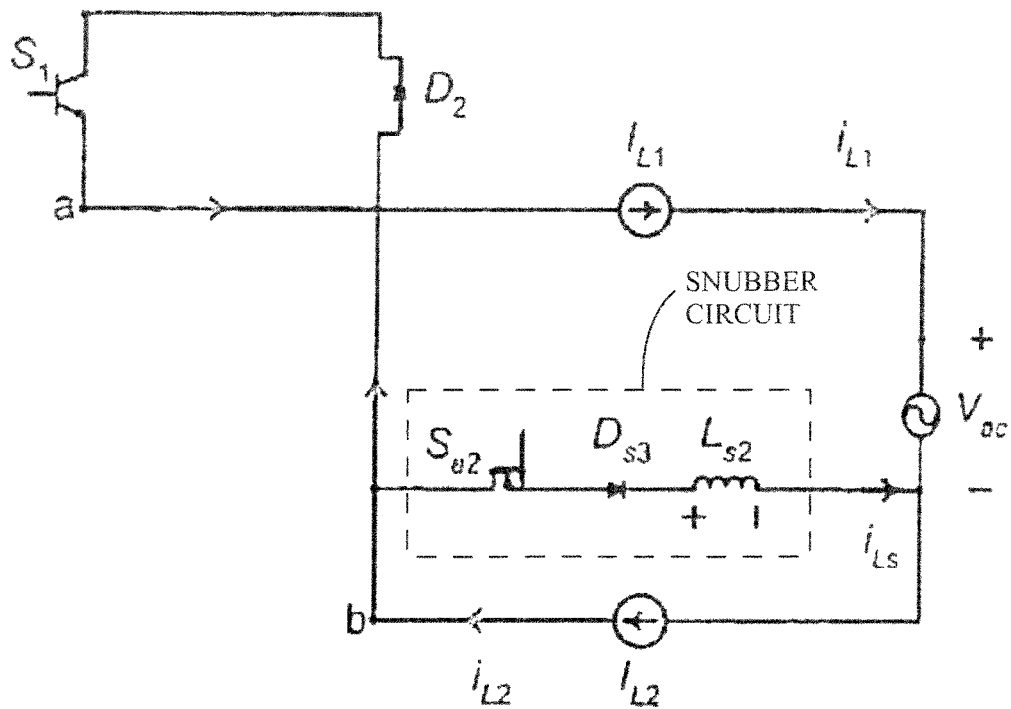

The snubber circuit presented in the papers of L. C. de. Freitas and P. R. C. Gomes and K. M. Smith and K. M. Smedley cannot be implemented in the inverter with inductors 152, 158 on both live and neutral wires. FIG. 7 shows the circuit schematic of applying such a case. FIG. 8 shows the problem of the snubber circuit in the application of FB inverter. When the auxiliary switch $S_{a1}$ or $S_{a2}$ (corresponding to first filtering unit switch 164 or first filtering unit switch 170 in FIG. 1) is on, electric current, $i_{Ls}$, from the snubber circuit has no way to go. It is because $L_1$ and $L_2$ can be considered as constant current sources in such as short time window and $I_{L1}$ may be equal to $I_{La}$.

Therefore, additional electrical path circuits 178, 184 may be used, in an embodiment, for bypassing the electric currents of the first and second inductors 152, 158, which may also be called snubber inductors. In the following analysis, the electric path circuit s 178, 184 are employed to realize the operation as an example. The electric path circuits 178, 184 may serve as an active virtual ground without limiting to it. There may be any other solutions which may provide an electrical path for electric currents of the third inductor 176 to go through.

FIG. 1 shows the circuit schematic of the proposed filter circuit 150, which may also be called snubber circuit, integrated into a FB with the electrical path circuits 178, 184. The proposed filter circuit 150 and its inner circuit 152A comprises two auxiliary switches, 164 and 170, four diodes 166, 168, 172, 174, which may be called snubber diodes, and a single third inductor 176, although it may comprise a plurality of sub-inductors in series. The third inductor 176 is electrically coupled between the cathodes of the first diode 166 and the second diode 168 and the anodes of the third diode 172 and the fourth diode 174. The electric path circuits 178, 184 provide a low impedance path for the snubber current from the third inductor 176 to go through to a suitable input DC node 10, 12, which solves the problem of the snubber current discussed above.

In explanation of FIGS. 9 to 14, the operation of the first lower switch 108 has not been described. However, its operation is corresponding but opposite to that of the first higher switch 106, as a person skilled in the art can understand on the basis of the full-bridge inverters in general and the explanation of the operation of the first higher switch 106 in this document.

Figure 9:
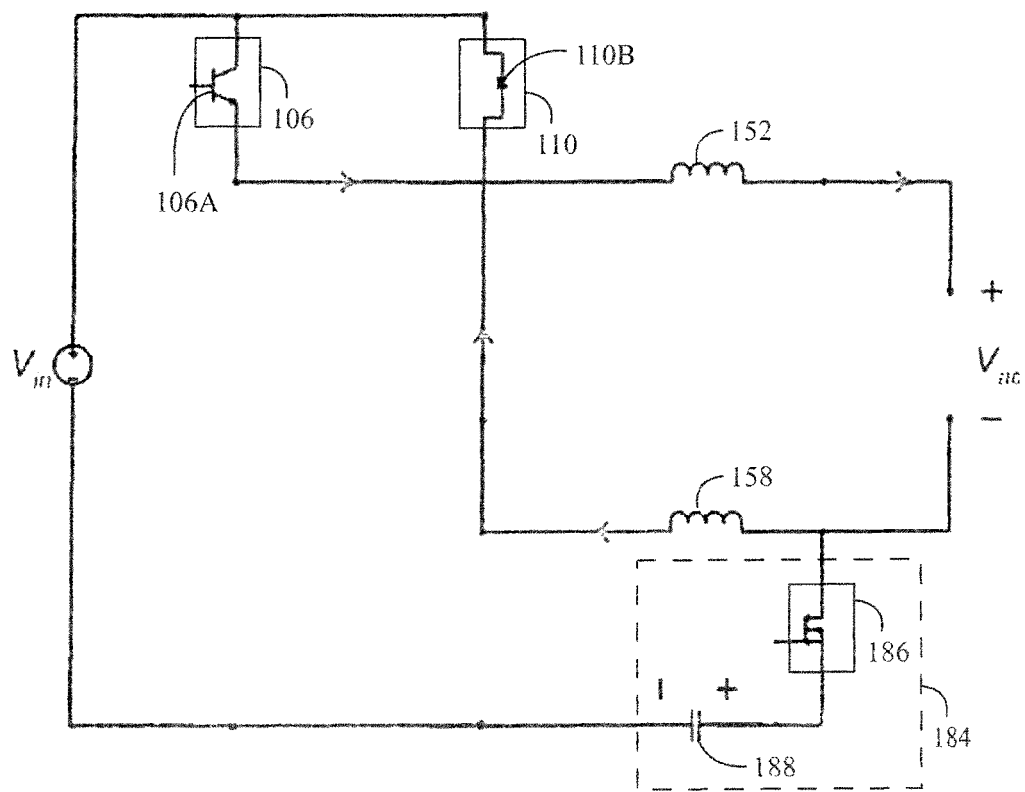
FIGS. 9 to 14 illustrate an example of operation of the full-bridge inverter with a filter circuit.
Figure 10:
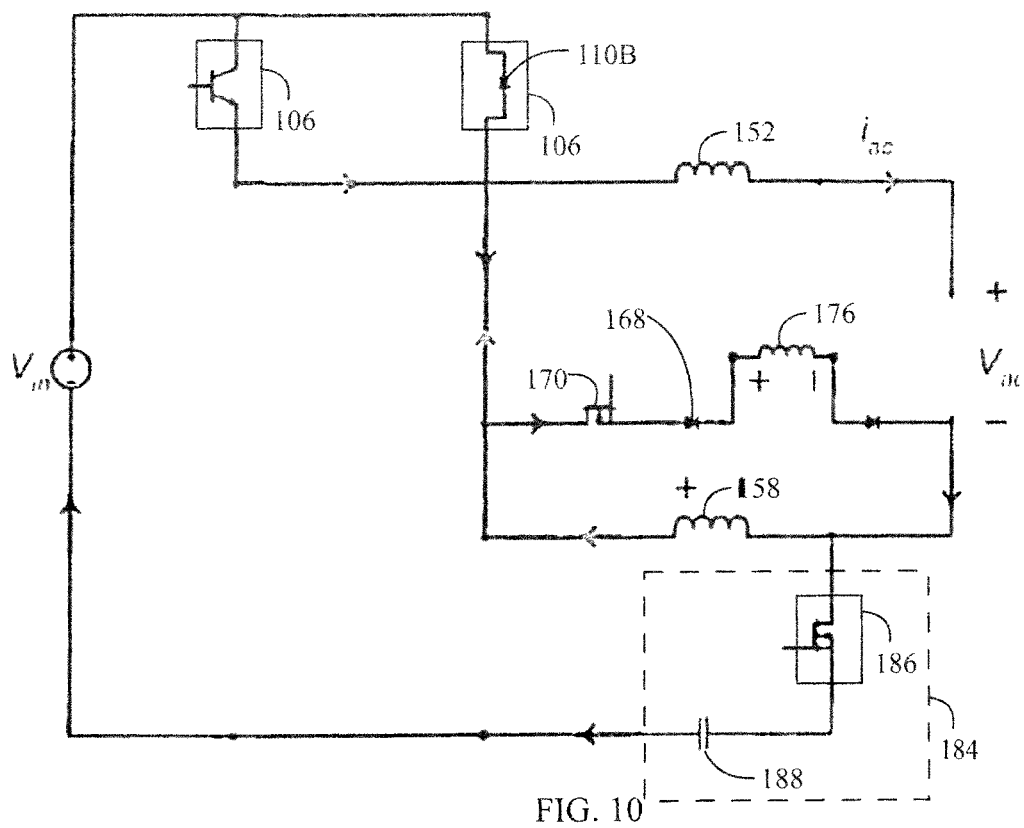
Figure 11:
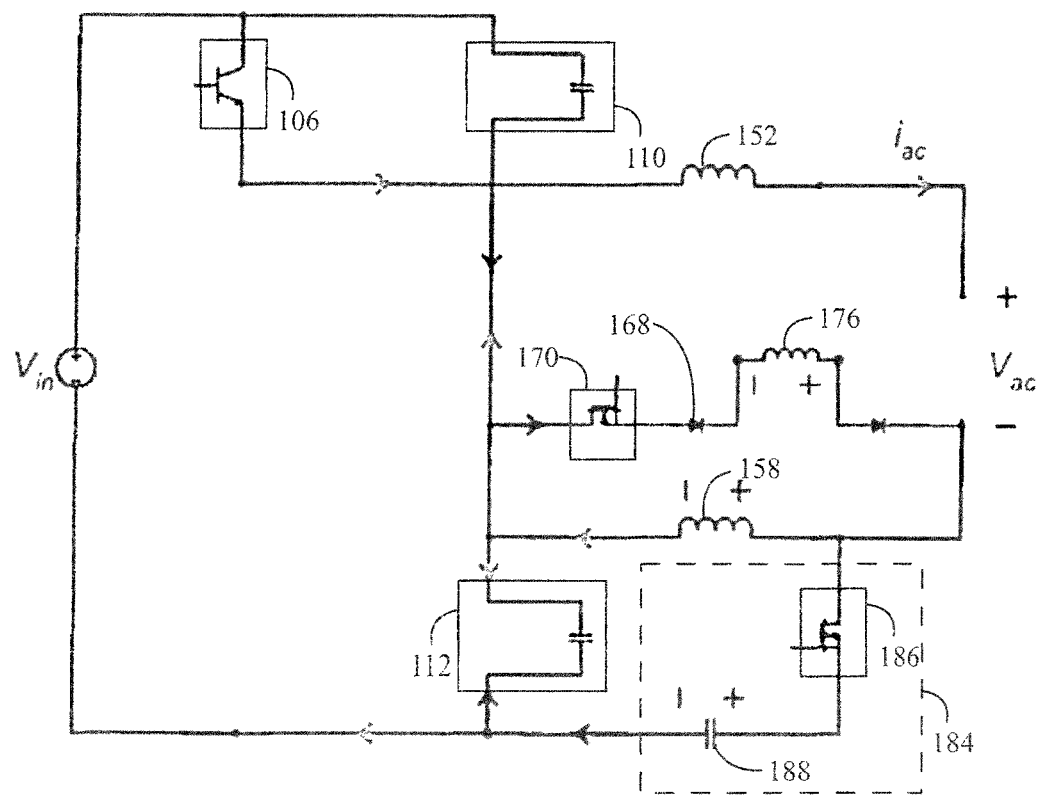
Figure 12:
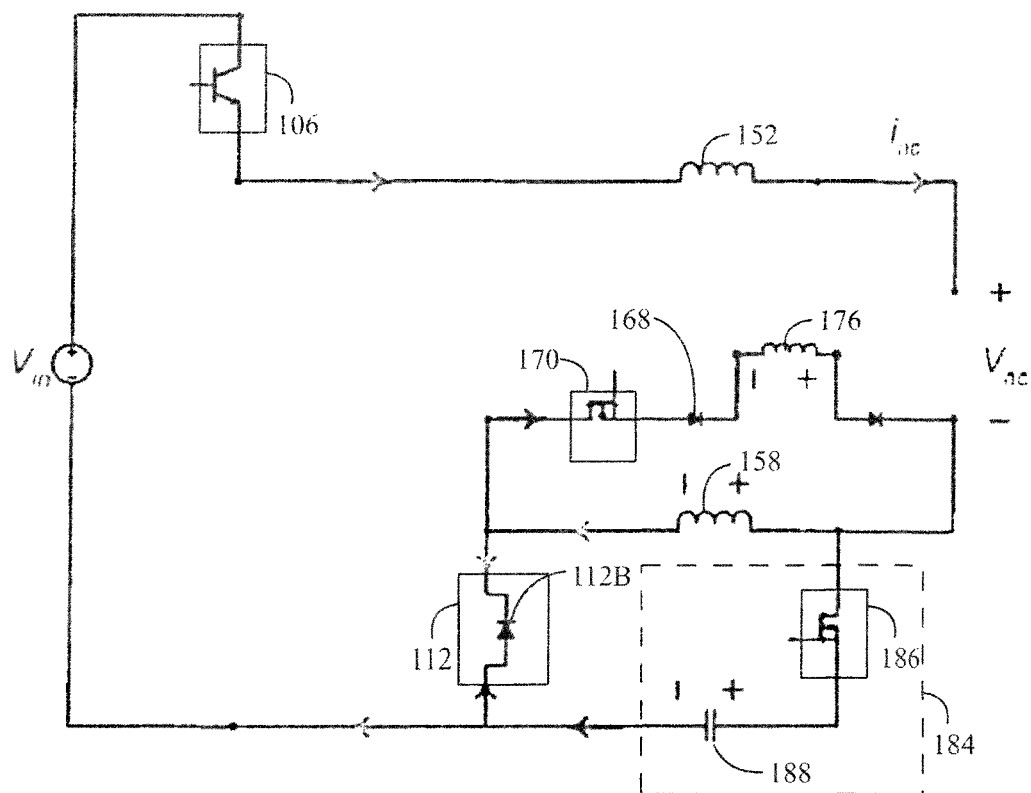
Figure 13:
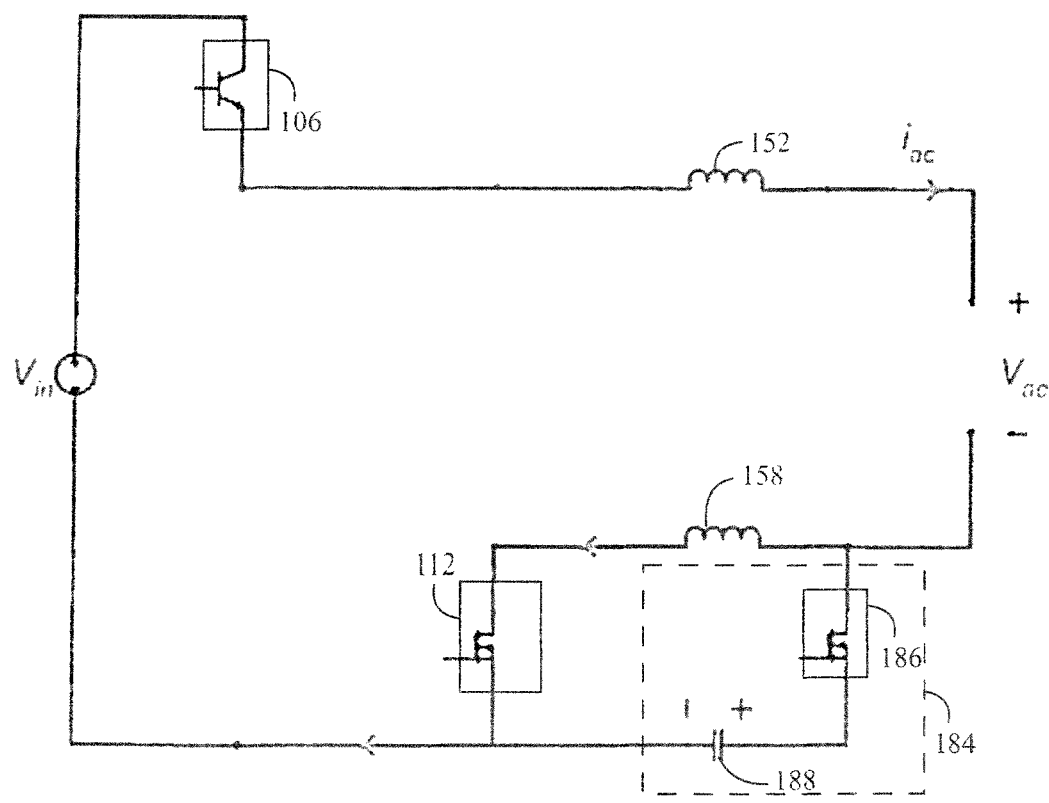
Figure 14:
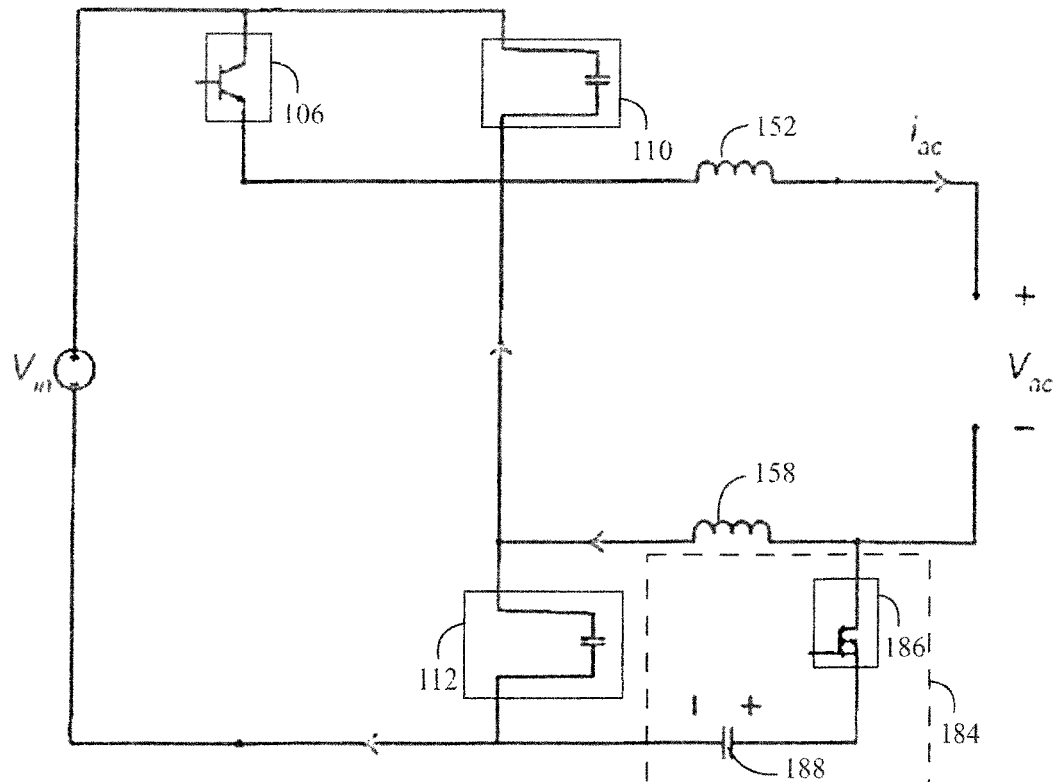

FIG. 9 illustrates operation of the full-bridge inverter 100 of the FIG. 1 in a free wheeling stage. FIG. 10 illustrates operation of the full-bridge inverter 100 in a circulating stage of the snubber. FIG. 11 illustrates operation of the full-bridge inverter 100 in a commutation stage. FIG. 12 illustrates operation of the full-bridge inverter 100 in a stage of zero voltage turn-on of the second lower switch 112 and a reset of the third inductor 176. FIG. 13 illustrates operation of the full-bridge inverter 100 in energy transfer stage. FIG. 14 illustrates operation of the full-bridge inverter 100 in a stage of zero voltage turn-off of the second lower switch 112.

In the freewheeling stage (see FIGS. 1 and 9), i.e. in the first stage, which lasts from a moment to $t_0$ a moment $t_1$, the first higher switch 106, i.e. a transistor 106A, and a diode 110B of the second higher switch 110 are electrically conducting and a load current may flow through them. The electric path circuit 184 is in an electrically conducting state, which forms an LC filter with the first and second inductors 152, 158 and a capacitor 188 of the electric path circuit 184. This, in turn, may suppress the differential mode current ripple to the ac grid and thus gives a high quality output current. It also may provide a low impedance path for the common mode current, which can significantly reduce the ground leakage current via the parasitic capacitor between the reference terminal of the inverter and the ground. The free wheeling ends when the second filtering unit switch 170 (compare with auxiliary switch of prior art) turns-on.

In the circulating stage (see FIGS. 1 and 10) i.e. in the second stage, which lasts from a moment $t_1$ to a moment $t_2$, the second filtering unit switch 170 turns on. The third inductor 176 is now parallel with the second inductor 158. An electric current form the second inductor 158 through the diode 110B is compensated by an electric current of the third inductor 176 $i_{LS}$. The electric current $i_{LS}$ is reaching the diode 110B via the second path switch 184, i.e. a transistor 186A, which solves the problem with the electric current of the second inductor 158. Because of the presence of Ls (third inductor 176), Sa2 (second filtering unit switch 170) turns-on at zero current:

$$i_{LS} = \frac{1}{LS} \int (V_{in} - v_{c2}(t))dt \quad (1)$$

$$v_{C_2}(t) = V_{in} - v_{ac}(t) \quad (2)$$

$$i_{D_2}(t) = i_{ac}(t) - i_{L_s}(t) \quad (3)$$

where $i_{LS}$ is an electric current though the third inductor 176, LS is an inductance of the third inductor 176 $V_{in}$ is the DC input voltage, $v_{c2}(t)$ is a voltage over the capacitor 188 as a function of time t, $v_{ac}(t)$ is an AC output voltage of the inverter as function of time t, $iD2(t)$ is an electric current through the diode 110B, $i_{ac}(t)$ is an output electric current of the inverter as a function of time t, and $i_{LS}$ is an electric current through the third inductor 176.

The operation in this circulation stage ends when $i_{D2}$ equals to zero, duration of this mode is:

$$t_2 - t_1 = L_s \frac{I_{ac}\sin\omega t_1}{V_{ac}\sin\omega t_1} \quad (4)$$

where $L_S$ is the same as LS above, $I_{ac}$ is a maximum of an AC electric current and $V_{ac}$ is a maximum of an AC electric voltage.

An operation of the commutation stage, i.e. the third stage (see FIGS. 1 and 11), starts when the current $i_{LS}$ though the third inductor 176 is larger than $i_{L1}$, which is an electric current flowing through the first inductor 152. Then the diode 110B turns off, i.e. no electric current passes through it. The magnitude of the electric current $i_{LS}$ decreases on the basis of a resonance process between a capacitance of the second higher switch 110, a capacitance of the second lower switch 112 and the third inductor 176 (assuming that the capacitor 188 of the lower electric path 184 is not affecting, because the capacitor 188 is much bigger than a capacitance of the second higher switch 110 and second lower switch 112). What is explained above can be expressed also mathematically in a following manner:

$$i_{L_s}(t) = v_{ac}(t)\sqrt{\frac{C_1 + C_2}{L_s}} \sin\frac{t}{\sqrt{L_s(C_1 + C_2)}} \quad (5)$$

$$v_{C_1}(t) = \frac{C_2(V_{in} - v_{C_3}[0^-])}{C_1 + C_2} + v_{ac}(t)\left(1 - \cos\frac{t}{\sqrt{L_s(C_1 + C_2)}}\right) \quad (6)$$

$$v_{C_2}(t) = V_{in} - v_{C_1}(t) \quad (7)$$

where $C_1$ may relate to the first capacitor 182 of the first electric path 178 and/or the second higher switch 110 (Cs2), $C_2$ may relate to the second capacitor 188 of the second electric path 184 and/or the second lower switch 112 (Cs4), $v_{C_2}[0^-]$ is a voltage over the second capacitor 188, and $v_{C_1}$ is a voltage over the first capacitor 182.

Operation of this third stage ends when the capacitance of the second higher switch 110 is fully charged, duration of this mode is:

$$t_3 - t_2 = \sqrt{LS(C_1 + C_2)} \cos^{-1}\left(1 - \frac{V_{in} - \frac{C_2(V_{in} - v_{C_2}[0^-])}{C_1 + C_2}}{v_{ac}(t)}\right) \quad (8)$$

Operation of the ZV turn on stage, i.e. the fourth stage, starts when a capacitance of the second lower switch 112 is fully discharge and the diode 112B conducts electrically (see FIGS. 1 and 12). The second lower switch 112 now turns on in at zero voltage condition. At the same time, the voltage across the second inductor 158 is reversed because of the conduction of the diode 112B of the second lower switch 112. The voltage polarity across the third inductor 176 also reverses and the third inductor 176 resets in this mode of operation. Operation of this stage ends when an electric current $i_{LS}$ of the third inductor 176 becomes equal to zero, as the snubber diodes 108B and 112B turn off, i.e. no electric current flow through them, at the zero current condition. This minimizes the loss from reverse recovery effect. This can be expressed mathematically in the following manner:

$$i_{L_s}(t) = \frac{1}{L_s}\int (V_{in} - v_{ac}(t))dt \quad (9)$$

Operation of this stage ends when $i_{LS}$ equals to zero, duration of this mode is:

$$t_4 - t_3 = L_s \frac{i_{L_s}(t_3)}{V_{in} - V_{ac}\sin\omega t_3} \quad (10)$$

In the energy transfer stage, which is the fifth stage lasting from moment t4 to moment t5, the second higher switch 110 and the second lower switch 112 are electrically conducting and energy is transferring from input 10, 12 to the ac output 190, 192 (see FIGS. 1 and 13). The second switch 186 of the second electric path 184 is also still electrically conducting, which keeps the LC output filter structure, i.e. the filter circuit 150, working providing a low impedance path for the common mode current. The electric current of the second inductor 158 may be mathematically expressed as:

$$i_{L_2}(t) = \frac{(V_{in} - V_{ac}\sin\omega t)V_{ac}\sin\omega t}{2V_{in}f_{sw}} + I_{ac}\sin\omega t \quad (11)$$

Operation of this fifth stage ends when the duty cycle is finished.

In the ZV turn-off stage, i.e. in the sixth stage, the second lower switch 112 turns off when the duty cycle of the previous period is finished (see FIGS. 1 and 14). The second lower switch 112 turns-off at zero voltage condition because of the presence of the capacitances of the second higher switch 110 and the second lower switch 112, which reduces the voltage change dv/dt of terminal voltage of the second higher switch 110 and the second lower switch 112. Mathematically this stage may be expressed as follows:

$$v_{C_4}(t) = \frac{1}{v_{dc\_s2} + C_{dc\_s4}}\int i_{L_2} dt \quad (12)$$

$$v_{C_{dc\_s1}}(t) = V_{in} - v_{C_{ds_{s4}}}(t) \quad (13)$$

where $v_{C_4}(t)$ refers to a voltage over the capacitance of the second lower switch 112, $C_{dc\_S2}$ refers to a capacitance of the second higher switch 110, $C_{dc\_S4}$ refers to a capacitance of the second lower switch 112, $v_{C_{ds\_S1}}(t)$ refers to a voltage over the capacitance of the first higher switch 106, and the $$v_{C_{ds_{S4}}}(t)$$

(the same as $v_{C_{ds\_S4}}(t)$) is a voltage over the capacitance of the second lower switch 112. Operation of this stage ends when $v_{C_{ds\_S4}}(t)$ is equal to the input voltage $V_{in}$, and a duration of this mode is:

$$t_6 - t_5 = \frac{(C_{dc\_s2} + C_{dc\_s4})V_{in}}{i_{L_3}(t_5)} \quad (14)$$

Figure 15:
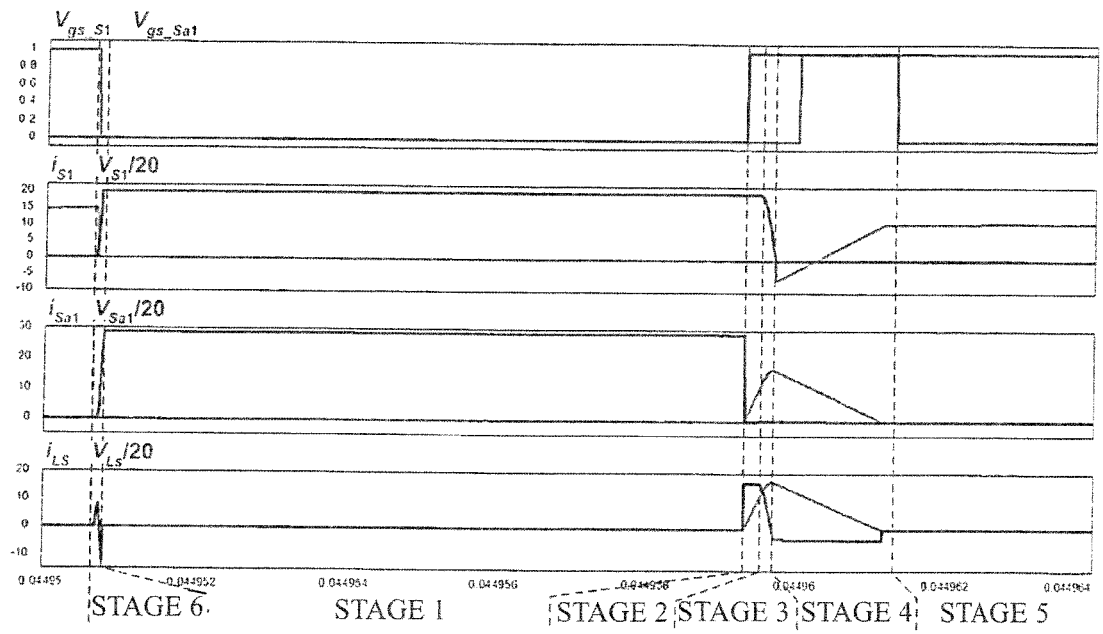
FIG. 15 illustrate an example of simulation.

The operation and theoretical prediction of the full-bridge inverter 100 have been verified by computer. FIG. 15 shows the simulation results of the full-bridge inverter 100 based on a unipolar switching scheme. A control voltage of the second lower switch 112 is Vgs_S1, a control voltage of the second filtering unit switch 170 is Vgs_Sa1, an electric current through the second lower switch 112 is iS1, and iLS is an electric current through the third inductor 176. The top window shows the gate signals of the first higher switch 106 and the first filtering unit switch 164. The second and third windows show the voltage and current switching waveforms of the first higher switch 106 and the first filtering unit switch 164, respectively. The last window shows the voltage and current waveforms of the third inductor 176.

In the operation of the first stage, the inverter is freewheeling. The main switch, i.e. the first higher switch 106 is on, the second lower switch 112 and the first filtering unit switch 164 are off. The first filtering unit switch 164 turns on and the operation of the second stage begins.

The electric current $i_{LS}$ of the third inductor 176 is increasing during the operation of this stage until the electric current $i_{LS}$ reaches the load current, $i_{ac}$.

In operation of the third stage, the diode 110B is off and the output capacitances of the second higher switch 110 and the second lower switch 112 are discharging and charging, respectively. Operation of this stage ends and operation of the fourth stage starts when a voltage over the second lower switch 112 is equal to zero and the diode 112B conducts.

The second lower switch 112 turns on before the electric current going through the diode 112B is equal to zero. The third inductor 176 resets and the gate signal of the first filtering unit switch 164 can turn off when the electric current through the third inductor 176 is equal to zero. This is the end of fourth stage.

The fifth stage starts and continues until the duty cycle finished. The second lower switch 112 turns off under zero voltage condition in the sixth stage. This stage ends when a voltage over the second lower switch 112 reaches the input voltage Vin. These stages complete the operation in one switching cycle, and a new cycle may start from the first stage.

In short, in the freewheeling stage the first higher switch 106 is in an electrically conducting state and the second lower switch 112 is in an electrically non-conducting state. A high frequency disturbance may then be filtered by setting the second switch 186 of the second electric path 184 (if this part of the circuit is available) in an electrically conducting state. In a situation where the inverter has just been started, no energy has been stored in the first and second inductors 152, 158 and no electric current may be flowing out of them.

In the second stage, an electric current through the diode 110B is run to zero, and for that purpose the second filtering unit switch 170 is switched into an electrically conducting state, which allows an electric current to flow from the first higher switch 106 to the second filtering unit switch 170. At the same time, the energy stored in the first and second inductors 152 and 158 is transferred to the third inductor 176.

In the third stage, when the diode 110B has become electrically non-conductive (voltage over diode 110B becomes opposite), the DC voltage at the first and second DC nodes 10 and 12 feeds electric current through capacitances of the second higher switch 110 and the second lower switch 112. The capacitance of the second higher switch 110 becomes loaded with electric energy and the capacitance of the second lower switch 112 discharges. This causes a voltage over the first and the second higher and lower switches 110, 112 become stabilized.

In the fourth stage, electric current in the inner circuit 150A may be caused to become zero by letting the electric current flow through the second path switch 186. Then the electric energy is transferred from the third inductor 176 to the second capacitor 188 (resonance circuit). When an electric current of the second inductor 158 becomes zero, the second filtering unit switch 170 can be opened (made electrically non-conductive) and the second lower switch 112 may be closed (made electrically conductive) at least almost without voltage over it.

In the fifth stage, either the first higher switch 106 and the second lower switch 112 are electrically conductive (positive half of cycle) or the lower switch 108 and the second higher switch 110 are electrically conductive (negative half of cycle).

In the sixth stage, the second lower switch 112 is opened (made electrically non-conductive) for returning through a transient period back to the freewheeling stage.

Figure 16:
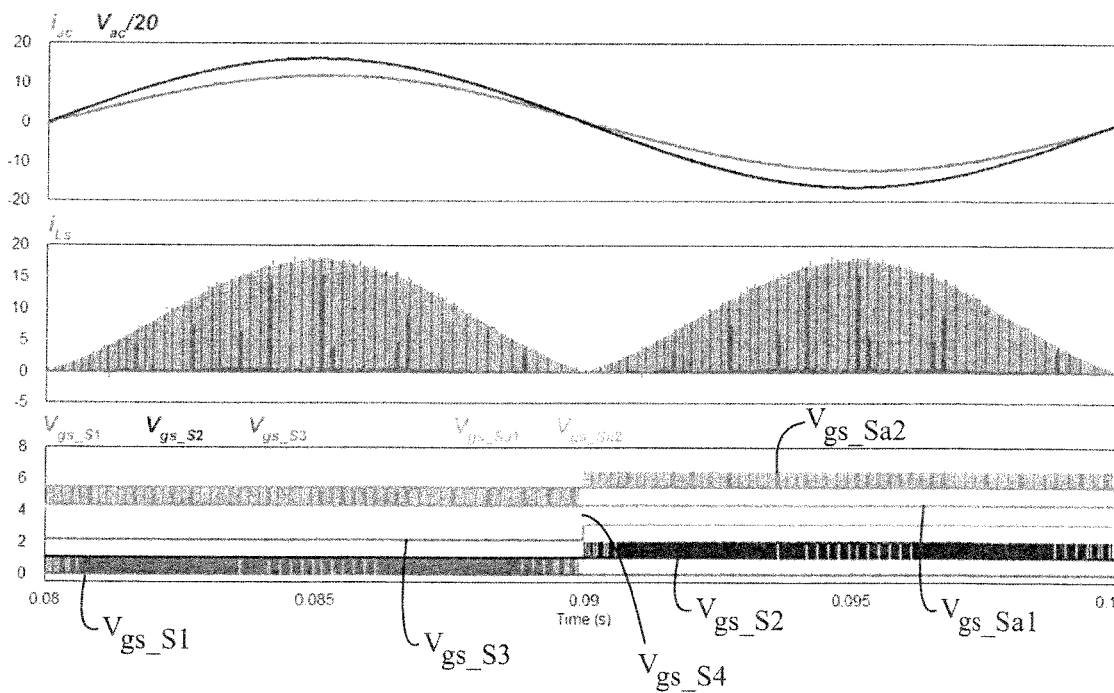
FIG. 16 illustrate an example of waveforms.

FIG. 16 shows the waveforms in the successive stages of the cycle. $V_{gs\_S1}$ means a gate voltage of the first higher switch 106, $V_{gs\_S2}$ means a gate voltage of the second higher switch 110, $V_{gs\_S3}$ means a gate voltage of the first lower switch 108, $V_{gs\_S4}$ means a gate voltage of the second lower switch 112, $V_{gs\_Sa1}$ means a gate voltage of the first filtering unit switch 164, and $V_{gs\_S1}$ means a gate voltage of the first higher switch 106 The output current quality is not affected by the snubber circuit. The top window shows the inverter output current waveform and it has a high quality. The middle window shows the electric current of the third inductor 176, which shows the filter circuit 150 is operating throughout the cycle. The magnitude of the electric current of the third inductor 176 is adaptive to the load current. This is an advantage of the present full-bridge inverter 100 based on a unipolar switching scheme as the losses can be minimized.

Figure 17:
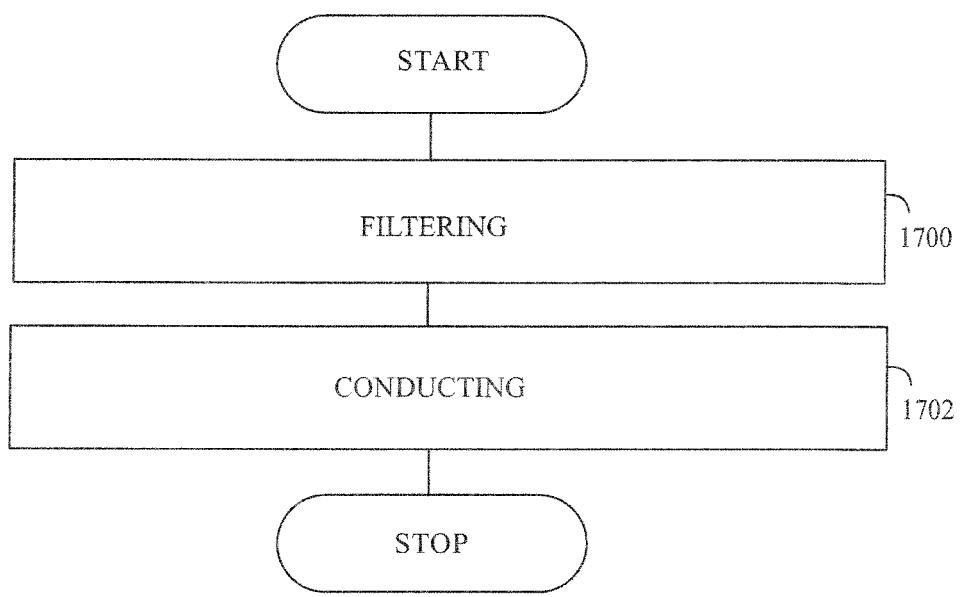
FIG. 17 illustrates of an example of a flow chart of an operating method of the full-bridge inverter.

FIG. 17 is a flow chart of the operation method. In step 1700, a signal within the full-bridge inverter 100 is filtered with a first inductor 152, a second inductor 158, and third inductor 176, where one pin 154 of the first inductor 152 being electrically coupled with a first branch conductor 120, the first branch conductor 120 being electrically coupled between the first higher switch 106 and the first lower switch 108, and an opposite pin 156 of the first inductor 152 being electrically coupled with a first output node 190 of the full-bridge inverter 100;

one pin 160 of the second inductor 158 being electrically coupled with a second branch conductor 122, the second branch conductor 122 being electrically coupled between the second higher switch 110 and the second lower switch 112, and an opposite pin 162 of the second inductor 158 being electrically coupled with a second output node 192 of the full-bridge inverter 10; and the third inductor 176 being electrically coupled between cathodes of a first diode 166 and a second diode 168 and anodes of a third diode 172 and a fourth diode 174, where the first filter diode 166, the second filter diode 168 and a second filtering unit switch 170 in series are electrically coupled between the first branch conductor 120 and the second branch conductor 122, cathodes of the first diode 166 and the second diode 168 are electrically coupled together, and a cathode of the third diode 172 being electrically coupled with a first output 190 and a cathode of the fourth diode 174 being electrically coupled with a second output 192 of the full-bridge inverter 100.

In step 1702, which is optional, an electric current between the third inductor 176 and the first DC node 10 is conducted through electric path circuit 178 in response to switching the first filtering unit switch 164 into an electrically conducting state, and an electric current between the third inductor 176 and the second DC node 12 is conducted through electric path circuit 184 in response to switching the second filtering unit switch 170 into an electrically conducting state.

Figure 18:
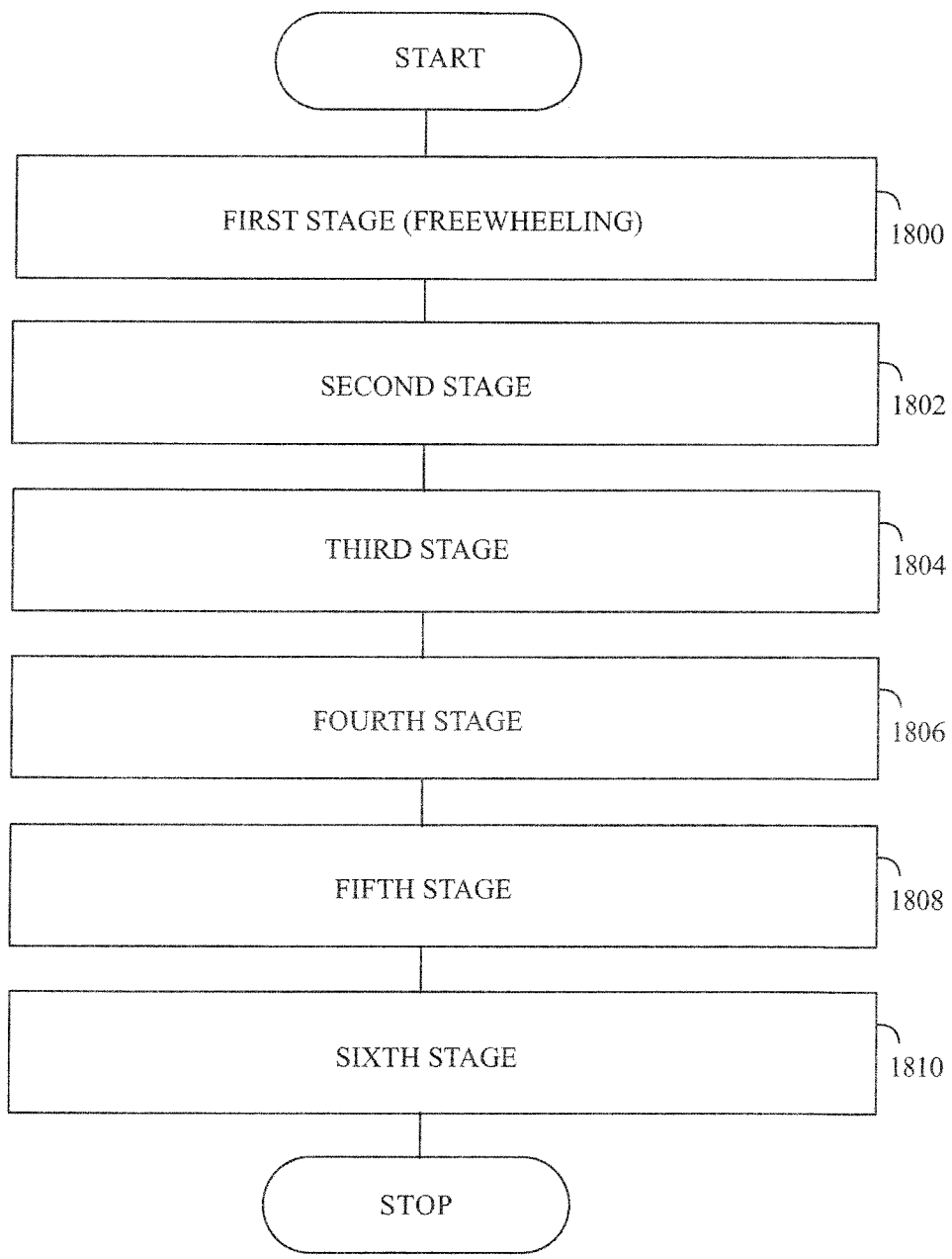
FIG. 18 illustrates a flow chart of six stages of the operation method.

FIG. 18 is a flow chart of six stages of the operation method. In a first stage 1800, switching a first higher switch 106 of a first branch 102 in an electrically conducting state, while a second electric path circuit 184 is in an electrically conducting state, for suppressing differential mode ripple and providing a low impedance part for a common mode with a first inductor 152 and a second inductor 158.

In a second stage 1802, switching second filtering unit switch 170 into an electrically conducting state, and causing a third inductor 176 to be parallel with a second inductor 158, and compensating an electric current from the second inductor 158 passing through a diode 110B of a second higher switch 110 by an electric current flowing through the third inductor 176 of the filter circuit 150, the electric current flowing through the third inductor 176 reaching a diode 110B of the second higher switch 110 via the second electric path circuit 184.

As to an third stage 1804, causing the full-bridge inverter 100 to enter this stage when the electric current through the second higher switch 110 becomes zero, while the electric current flowing through the third inductor 176 becomes larger than an electric current through the first inductor 152 for switching the second higher switch 110 in a non-conducting state, and decreasing a strength of the electric current flowing through the third inductor 176 by a resonance between an inductance of the third inductor 176, and capacitances of the second higher switch 110 and a second lower switch 112.

As to a fourth stage 1806, causing the full-bridge inverter 100 to enter in this stage in response to fully charging the capacitance of the second higher switch 110 and fully discharging a capacitance of the second lower switch 112, making the diode 112B of the second lower switch 112 to electrically conduct at a zero-voltage condition for causing a voltage over the second inductor 158 and the third inductor 176 reverse, and making a diode 108B of a first lower switch 108 and the diode 112B of the second lower switch 112 in a non-conducting state in response to the electric current flowing through the third inductor 176 reaching zero for proceeding to a fifth stage.

As to fifth stage 1808, causing the full-bridge inverter 100 to enter in this stage in response to the electric current flowing through the third inductor 176 reaching zero, switching first lower switch 108 and the second lower switch 112 in electrically conducting states, filtering using the resonance between the inductance of the third inductor 176, and the capacitances of the second higher switch 110 and a second lower switch 112 by allowing the second electric path circuit 184 be electrically conductive.

In a sixth stage 1810, switching the second lower switch 112 in a non-conducting state for ending the zero-voltage condition, shifting to the first stage in response to condition where a voltage over the second lower switch 112 is equal to an input voltage.

The control of the switches of the full-bridge inverter 100 based on a unipolar switching scheme may be implemented as a logic circuit solution or computer program in order to achieve the operation of the full-bridge inverter 100. The computer program may be placed on a computer program distribution means for the distribution thereof. The computer program distribution means is readable by a data processing device, and it encodes the computer program commands, carries out the operation of the full-bridge inverter 100.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. A full-bridge inverter based on a unipolar switching scheme, the full-bridge inverter being configured to convert DC electric power to AC electric power, wherein the full-bridge inverter comprises
   a first branch and a second branch, which are electrically coupled in parallel between a first DC node and a second DC node of the full-bridge inverter configured to receive the DC electric power, the first branch comprising a first higher switch and a first lower switch in series, and the second branch comprising a second higher switch and a second lower switch in series;
   a filter circuit comprising
   a first inductor, one pin of the first inductor being electrically coupled with a first branch conductor, the first branch conductor being electrically coupled between the first higher switch and the first lower switch, and an opposite pin of the first inductor being electrically coupled with a first output node of the full-bridge inverter;
   a second inductor, one pin of the second inductor being electrically coupled with a second branch conductor, the second branch conductor being electrically coupled between the second higher switch and the second lower switch, and an opposite pin of the second inductor being electrically coupled with a second output node of the full-bridge inverter;
   a first filtering unit switch, a first filter diode, a second filter diode and a second filtering unit switch in series electrically coupled between the first branch conductor and the second branch conductor, cathodes of the first diode and the second diode being electrically coupled together;
   a third filter diode, whose cathode is electrically coupled with the first output node, and a fourth filter diode, whose cathode is electrically coupled with the second output node, the anodes of the third diode and the fourth diode being electrically coupled together; and
   a third inductor electrically coupled between the cathodes of the first diode and the second diode and the anodes of the third diode and the fourth diode.

2. The full-bridge inverter of claim 1, which further comprises electric path circuits configured to conduct an electric current between the third inductor and the first DC node in response to switching the first filtering unit switch in an electrically conducting state, and conduct an electric current between the third inductor and the second DC node in response to switching the second filtering unit switch in an electrically conducting state.

3. The full-bridge inverter of claim 2, wherein the electric path circuits comprise a first electric path circuit electrically coupled between the second output node and the lower node for conducting an electric current between the third inductor and the second DC node, and a second electric path circuit electrically coupled between the first output node and the first DC node for conducting an electric current between the third inductor and the first DC node.

4. The full-bridge inverter of claim 2, wherein the first electric path circuit comprises a first path switch and a first capacitor in series, the first path switch being configured to switch in an electrically conducting state for conducting an electric current between the third inductor and the first DC node, and the second electric path circuit comprises a second path switch and a second capacitor in series, the second path switch being configured to switch in an electrically conducting state for conducting an electric current between the third inductor and the second DC node.

5. The full-bridge inverter of claim 1, wherein the first higher switch, and the second higher switch comprises a bipolar junction transistor and a reverse biased diode; and the first lower switch and the second lower switch comprises a field effect transistor and a reverse biased diode.

6. A method of operation of a full-bridge inverter based on a unipolar switching scheme, the method comprising filtering a signal within the full-bridge inverter with a first inductor, a second inductor, and third inductor, where
   one pin of the first inductor being electrically coupled with a first branch conductor, the first branch conductor being electrically coupled between the first higher switch and the first lower switch, and an opposite pin of the first inductor being electrically coupled with a first output node of the full-bridge inverter;
   one pin of the second inductor being electrically coupled with a second branch conductor, the second branch conductor being electrically coupled between the second higher switch and the second lower switch, and an opposite pin of the second inductor being electrically coupled with a second output node of the full-bridge inverter;
   the third inductor being electrically coupled between cathodes of a first diode and a second diode and a anodes of a third diode and a fourth diode, where the first filter diode, the second filter diode and a second filtering unit switch in series are electrically coupled between the first branch conductor and the second branch conductor, cathodes of the first diode and the second diode are electrically coupled together, and a cathode of the third diode being electrically coupled with a first output and a cathode of the fourth diode being electrically coupled with a second output of the full-bridge inverter.

7. The method of claim 6, further comprising conducting, through electric path circuits, an electric current between the third inductor and the first DC node in response to switching the first filtering unit switch into an electrically conducting state, and an electric current between the third inductor and the second DC node in response to switching the second filtering unit switch into an electrically conducting state.

8. The method of claim 6, the method further causing the full-bridge inverter to go through the following succeeding operational states in cycles:
  a first stage where a first higher switch is in electrically conducting state, the second lower switch and a first filtering unit switch are in an electrically non-conducting state;
  a second stage where the first filtering unit switch is in an electrically conducting state causing an electric current flowing through a third inductor to increase until it reaches a same strength as an electric current flowing through a first inductor;
  a third stage where a reverse diode of a second higher switch is in an electrically non-conducting state, while capacitance of a second higher switch is discharging, and capacitance of a second lower switch is charging;
  a fourth stage where a voltage over the second lower switch is zero and a reverse diode parallel to the second lower switch conducts electrically, the second lower switch switches into an electrically conducting state before an electric current flowing through the reverse diode parallel to the second lower switch becomes zero, the third inductor resets and a the first filtering unit switch is switched into an electrically non-conductive state when an electric current flowing through the third inductor is zero;
  a fifth stage, whose duration depends on a duty cycle of a resonance between an inductance of the third inductor, and the capacitances of the second higher switch and a second lower switch;
  a sixth stage where the second lower switch is in an electrically non-conducting state under a zero-voltage condition, and which ends when a voltage of the second lower switch equals the input voltage of the full-bridge inverter.

9. The method of claim 6, wherein
  in a first stage, switching a first higher switch of a first branch in an electrically conducting state, while a second electric path circuit is in an electrically conducting state, for suppressing differential mode ripple and providing a low impedance part for a common mode with a first inductor and a second inductor;
  in a second stage, switching second filtering unit switch into an electrically conducting state, and causing a third inductor to be parallel with a second inductor, and compensating an electric current from the second inductor passing through a diode of a second higher switch by an electric current flowing through the third inductor of the filter circuit, the electric current flowing through the third inductor reaching a diode of the second higher switch via the second electric path circuit;
  causing the full-bridge inverter to enter in a third stage when the electric current through the second higher switch becomes zero, while the electric current flowing through the third inductor becomes larger than an electric current through the first inductor for switching the second higher switch in a non-conducting state, and decreasing a strength of the electric current flowing through the third inductor by a resonance between an inductance of the third inductor, and capacitances of the second higher switch and a second lower switch;
  causing the full-bridge inverter to enter in a fourth stage in response to fully charging the capacitance of the second higher switch and fully discharging a capacitance of the second lower switch, making the diode of the second lower switch to electrically conduct at a zero-voltage condition for causing a voltage over the second inductor and the third inductor reverse, and making a diode of a first lower switch and the diode of the second lower switch in a non-conducting state in response to the electric current flowing through the third inductor reaching zero for proceeding to a fifth stage;
  causing the full-bridge inverter to enter in the fifth stage in response to the electric current flowing through the third inductor reaching zero, switching first lower switch and the second lower switch in electrically conducting states, filtering using the resonance between the inductance of the third inductor, and the capacitances of the second higher switch and a second lower switch by allowing the second electric path circuit be electrically conductive; and
  in a sixth stage, switching the second lower switch in a non-conducting state for ending the zero-voltage condition, shifting to the first stage in response to condition where a voltage over the second lower switch is equal to an input voltage.

* * * * *